United States Patent
O'Keefe et al.

(10) Patent No.: US 9,247,306 B2
(45) Date of Patent: Jan. 26, 2016

(54) FORMING A MULTIMEDIA PRODUCT USING VIDEO CHAT

(75) Inventors: Brian Joseph O'Keefe, Rochester, NY (US); Kenneth Alan Parulski, Rochester, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 248 days.

(21) Appl. No.: 13/476,057

(22) Filed: May 21, 2012

(65) Prior Publication Data

US 2013/0307997 A1      Nov. 21, 2013

(51) Int. Cl.
*H04N 21/4788*   (2011.01)
*H04L 12/58*   (2006.01)
*G06F 17/30*   (2006.01)

(52) U.S. Cl.
CPC ...... *H04N 21/4788* (2013.01); *G06F 17/30038* (2013.01); *G06F 17/30056* (2013.01); *H04L 51/10* (2013.01); *H04L 51/16* (2013.01)

(58) Field of Classification Search
CPC ............... G06F 17/30038; G06F 17/30056; G06F 2212/464; H04N 21/4788; H04L 12/1813; H04L 12/2496; H04L 12/586; H04L 41/026; H04L 41/5093; H04L 51/16; H04L 51/10; H04L 29/06027; H04L 29/06176; H04M 2250/68; H04M 3/42221
USPC ........ 348/207.99, 207.1, 211.3, 222.1, 231.3, 348/239, 14.01–14.16; 358/1.9, 1.16; 705/3, 14, 300, 319; 709/204, 205, 709/206; 715/201, 203, 730, 751, 753, 758; 725/105, 109
See application file for complete search history.

(56) References Cited

U.S. PATENT DOCUMENTS

| | | | |
|---|---|---|---|
| 5,164,831 A | 11/1992 | Kuchta et al. | |
| 5,760,917 A | 6/1998 | Sheridan | |
| 6,389,181 B2 | 5/2002 | Shaffer et al. | |
| 6,721,001 B1 * | 4/2004 | Berstis | 348/231.3 |
| 6,873,435 B1 * | 3/2005 | Tehranchi et al. | 358/1.9 |
| 6,915,723 B2 | 7/2005 | Hsieh | |
| 7,027,836 B2 | 4/2006 | Zacks et al. | |
| 7,620,270 B2 | 11/2009 | Matraszek et al. | |
| 7,764,844 B2 | 7/2010 | Bouk et al. | |
| 2002/0059098 A1 * | 5/2002 | Sazawa et al. | 705/14 |
| 2003/0033305 A1 * | 2/2003 | O'Connor et al. | 707/10 |
| 2003/0097408 A1 * | 5/2003 | Kageyama et al. | 709/205 |
| 2004/0177116 A1 * | 9/2004 | McConn et al. | 709/204 |
| 2006/0136379 A1 | 6/2006 | Marino et al. | |
| 2006/0153460 A1 | 7/2006 | Kim et al. | |
| 2006/0190537 A1 * | 8/2006 | Morris | 709/204 |

(Continued)

OTHER PUBLICATIONS

Qian et al., "Exploring the Potentials of Combining Photo Annotating Tasks with Instant Messaging Fun", International Conference on Mobile and Ubiquitous Multimedia, ACM, Oct. 24, 2004, pp. 11-17.*

(Continued)

*Primary Examiner* — Dennis Hogue

(57) ABSTRACT

A method for forming a composite multimedia product pertaining to a digital image captured of a scene. The method includes sharing the digital image with a remote user, and facilitating a conversation with the remote user across a communication network. A portion of the conversation that is relevant to the shared digital image is automatically extracted and combined with the digital image to form the composite multimedia product.

18 Claims, 6 Drawing Sheets

(56) References Cited

U.S. PATENT DOCUMENTS

| | | | |
|---|---|---|---|
| 2007/0268312 | A1 | 11/2007 | Marks et al. |
| 2008/0174676 | A1 | 7/2008 | Squilla et al. |
| 2008/0215984 | A1* | 9/2008 | Manico et al. ............... 715/730 |
| 2009/0094247 | A1 | 4/2009 | Fredlund et al. |
| 2010/0091087 | A1* | 4/2010 | Takizawa ................ 348/14.14 |
| 2010/0188704 | A1* | 7/2010 | Hoarau et al. .............. 358/1.16 |
| 2011/0218996 | A1 | 9/2011 | Jin et al. |
| 2011/0282686 | A1* | 11/2011 | Venon et al. ..................... 705/3 |
| 2013/0013699 | A1* | 1/2013 | Huxley ......................... 709/206 |

OTHER PUBLICATIONS

Fleck, "Eavesdropping on Storytelling", Mobile and Media Systems Laboratory, Hewlett-Packard Company, 2004.*

Barthelmess et al., "Collaborative Multimodal Photo Annotation over Digital Paper," ICMI 06, Nov. 2-4, 2006.*

Veenelakanti et al., "The Picture Says It All! Multimodal Interactions and Interaction Metadata," ICMI 11, Nov. 14-18, 2011.*

International Search Report and Written Opinion on PCT/US2013/041828, mailed Jul. 31, 2013.

Qian Y et al, "Exploring the potentials of combining photo annotating tasks with instant messaging fun," International Conference on Mobile and Ubiquitous Multimedia, ACM, Oct. 24, 2004, pp. 11-17.

Degtyarev et al. "Comparative testing of face detection algorithms," Proc. 4th International Conference on Image and Signal Processing, pp. 200-209 (2010).

Kumar et al., "Key frame extraction from consumer videos using sparse representation," Proc. $18^{th}$ IEEE International Conference on Image Processing, pp. 2437-2440 (2011).

Papin et al. "Intelligent key frame extraction from unstructured consumer video clips," Visual Communications and Image Processing, Proc. SPIE vol. 6508, pp. 65082D (2007).

International Preliminary Report on Patentability for PCT/US2013/041828, mailed Dec. 4, 2014.

* cited by examiner

FORMING A MULTIMEDIA PRODUCT USING VIDEO CHAT

FIELD OF THE INVENTION

The present invention relates to image capture devices and systems, and more particularly to forming multimedia products using image capture devices and systems that share images over a network.

BACKGROUND OF THE INVENTION

Photography is often used to record and share experiences, such as vacation trips, family outings, or seasonal events. Still and video images of such experiences can be captured using image capture devices such as camera phones, digital cameras and camcorders. The digital images captured by these image capture devices can be shared by e-mail and uploaded to web sites such as Facebook and Flickr, where they can be viewed by friends. The uploaded images can be printed using photo service providers, such as the Kodak Gallery website. Users can order photo products, such as photo books and collages, which utilize uploaded digital images.

Mobile phones, tablet computers, networked cameras and other portable devices incorporating camera modules and network connections to the Internet have opened up new opportunities for capturing and sharing photographic images. They have also enabled two users, such as two family members living in different locations, to use a video chat system, such as Apple FaceTime, to see each other's faces while they conduct a conversation.

It is known to produce enhanced photo products by combining images captured with an image capture device and professionally produced digital content, as is described in commonly-assigned U.S. Patent Application Publication 2008/0174676 to Squilla et al, entitled "Producing enhanced photographic products from images captured at known events," which is incorporated herein by reference. The system includes a database for storing custom content for a plurality of events. The system also includes a digital image capture device that stores a digital image and information defining the date/time and geographic location of the digital image. A service provider automatically determines if the timestamp and the geographic information corresponds to events stored in the custom content database. A processor produces an enhanced photographic product including the captured digital image and custom content corresponding to the timestamp and location of the captured digital image.

It is known to use image recognition techniques to produce a photo collage from a plurality of images, as described in commonly-assigned U.S. Pat. No. 6,389,181 to Shaffer et al., entitled "Photocollage generation and modification using image recognition," which is incorporated herein by reference. The system sorts digital records associated with a plurality of images, by culling or grouping to categorize the records according to an event, person, or chronology, in order to automatically compose a photo collage.

It is known to use facial expressions to identify favorite images. For example, U.S. Pat. No. 7,620,270 to Matraszek et al., entitled "Method for creating and using affective information in a digital imaging system" describes a system which uses a camera to record a user's facial expression as they view images from a collection.

It is known to modify images of a user during a video communications session. U.S. Patent Application Publication 2007/0268312 to Marks et al., entitled "Methods and systems for processing an interchange of real time effects during video communication," describes a system (such as an on-line video game) where video from a first user (such as a video of their face) is transmitted over a network to a second user and real-time effects (RTE) are applied. For example, the face can be modified in real time, such as by enlarging the entire face or certain features (e.g., the mouth or eyes), or by adding a beard or a hat.

It is known to provide systems which enable captured images to be shared with various destinations. For example, commonly-assigned U.S. Patent Application Publication 2006/0136379 to Marino et al., entitled "Image content sharing device and method" describes a device having user inputs that enable content which is viewed in a presentation mode to be easily shared with different destinations.

It is known to organize images using the time of capture and content-based features. For example, U.S. Patent Application Publication 2006/0153460 to Kim et al., entitled "Method and apparatus for clustering digital photos based on situation and system and method for albuming using the same," describes a method for situation-based clustering of digital photos using the time as well as content-based features.

While the prior art provides systems and methods to capture and share images of an event with family and friends at a distant location, and to conduct a video chat with these same family and friends, none of these solutions provide for the interactions which occur during the video chat to become part of the story of the event. There remains a need for a system and method for forming a multimedia product using video chat.

SUMMARY OF THE INVENTION

The present invention represents a method for forming a composite multimedia product, comprising:
 capturing a digital image of a scene;
 sharing the digital image with a remote user;
 facilitating a conversation with the remote user across a communication network, the conversation pertaining to the shared digital image;
 automatically extracting a portion of the conversation that is relevant to the shared digital image; and
 forming the composite multimedia product by combining the digital image and the extracted portion of the conversation;
 wherein the method is performed at least in part using a data processor.

This invention has the advantage that it provides a mechanism for the interactions that occur between the users during the conversation to become part of the recorded story of an event.

It has the additional advantage that composite multimedia product can capture reactions and emotions of the users during their interactions pertaining to the digital image.

It has the further advantage that a composite multimedia product can be created that combines a digital image together with key segments of a video chat pertaining to the digital image.

Figure 1:
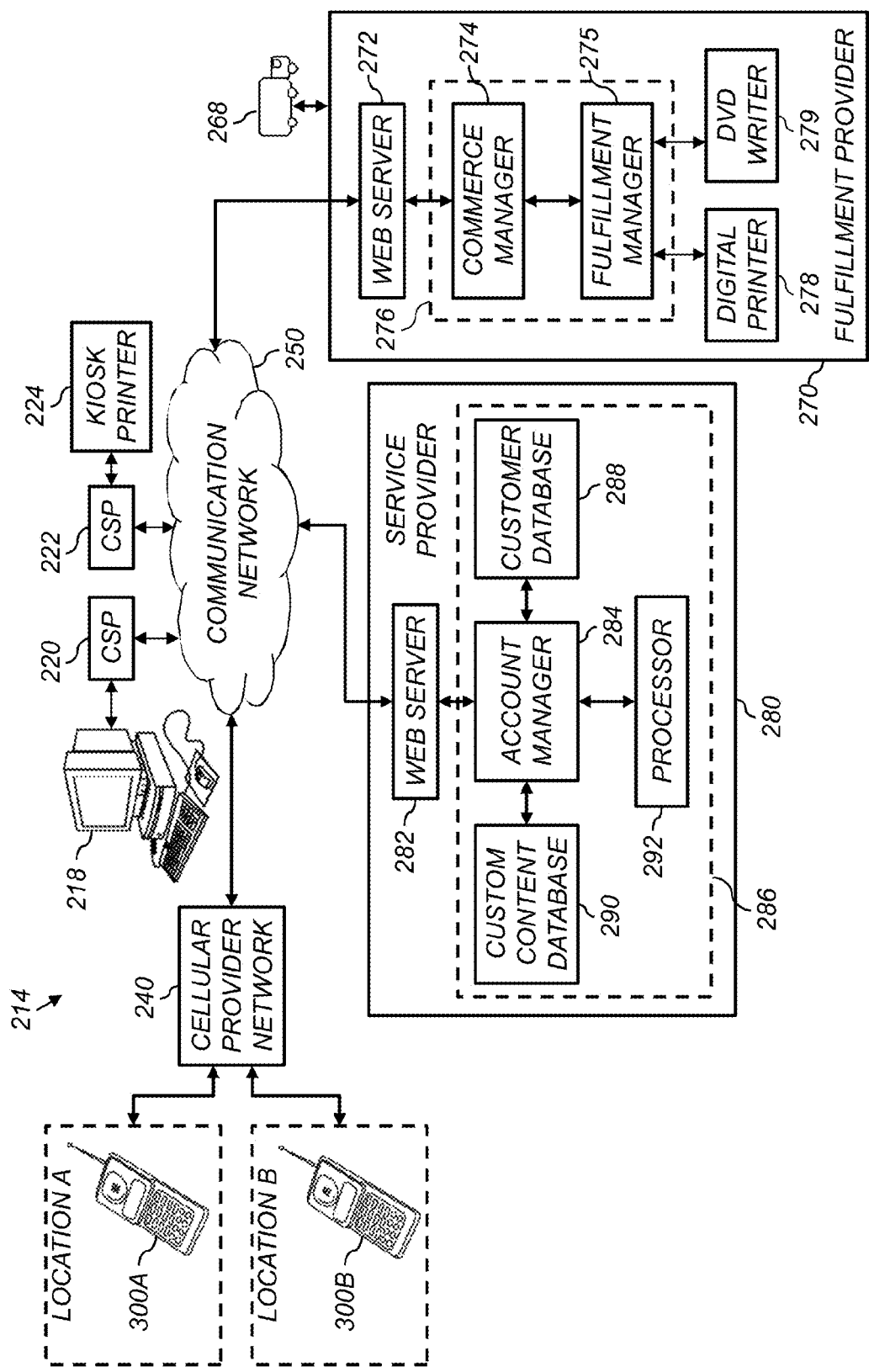
FIG. 1 is a block diagram of a digital imaging system in accordance with an embodiment of the present invention.

It is to be understood that the attached drawings are for purposes of illustrating the concepts of the invention and may not be to scale.

DETAILED DESCRIPTION OF THE INVENTION

Because wireless image capture devices and systems, such as camera phones connected via cellular telephone systems to service providers using the Internet are well known, the present description will be directed in particular to elements forming part of, or cooperating more directly with, the method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

In the following description, some embodiments of the present invention will be described in terms that would ordinarily be implemented as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware or software for producing and otherwise processing the image signals involved therewith, not specifically shown or described herein, can be selected from such systems, algorithms, components and elements known in the art. Given the system as described according to the invention in the following materials, software components not specifically shown, suggested or described herein that is useful for implementation of the invention is conventional and within the ordinary skill in such arts.

Still further, as used herein, a computer program for performing the method of the present invention can be stored in a non-transitory computer readable storage medium, which can include, for example; magnetic storage media such as a magnetic disk (e.g., a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program having instructions for controlling one or more computers to practice the method according to the present invention.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

The following description of image capture devices and imaging systems will be familiar to one skilled in the art. It will be obvious that there are many variations of this embodiment that are possible and are selected to reduce the cost, add features, or improve the performance of these devices and systems. The present invention is illustrated by way of example and not a limitation in the accompanying figures.

Referring to FIG. 1, there is illustrated a system 214 for capturing and sharing digital images, conducting a video chat session, and using the digital images and a portion of a video chat session to provide multimedia products. As used herein the term digital image includes both digital still images and digital video images. The term multimedia product refers to products that combine a plurality of content forms. Examples of different content forms would include still images, video clips, audio clips, text and graphics. Examples of multimedia product could include a photo collage or a photo book that combines images, text and graphics or a multimedia slide show that combines still images and video clips.

A first camera phone 300A, located at a first location A, and a second camera phone 300B, located at a second location B, can communicate using a cellular provider network 240. The cellular provider network 240 provides both voice and data communications using transmission devices located at cell towers throughout a region. The cellular provider network 240 is coupled to a communication network 250, such as the Internet. It will be understood that the system 214 typically includes many other camera phones, in addition to camera phone 300A and camera phone 300B. It will be understood that tablet computers and other types of handheld electronic devices can be used in addition to or instead of camera phones 300A and 300B. It will be understood that the system 214 can include multiple cellular provider networks 240, for example networks provided by companies such as Verizon, AT&T, and Sprint, which can be coupled to the communication network 250.

The communication network 250 enables communication with a service provider 280. Service provider 280 includes a web server 282 for interfacing with communication network 250. In addition to interfacing to communication network 250, web server 282 transfers information to a computer system 286 which manages images and information associated with various customers and with image content associated with different locations and events. It will be understood that the system 214 can include a plurality of service providers 280, which provide different services and can support different regions of the world.

The computer system 286 includes an account manager 284, which runs software to permit the creation and management of individual customer photo imaging accounts and to also permit the creation and management of collections of custom content images, such as professional images, and other content associated with various events and locations. The customer images and associated information are stored in a customer database 288. The customer account information can include personal information such as name and address, billing information such as credit card information, and authorization information that controls access to the customer's images by third parties. The professional images and other custom content associated with the supported events and locations are stored in custom content database 290.

The customer database 288 stores customer image files and related metadata, such as location and time information that identifies the location at which the image was captured, and the time of image capture. The custom content database 290 stores custom content, such as professionally captured images and other information, such as captions, titles, text, graphics, templates, and related metadata. For example, the custom content database 290 can store images and other information related to particular vacation destinations (e.g. Washington, D.C.; New York City; and Cape May, N.J.) and particular events (e.g., the Rose Bowl Parade, professional sporting events and concerts) and various themes (e.g., baseball games and birthday parties).

The computer system 286 includes a processor 292, which is used to analyze the pixel data of some of the images and audio information which are shared between camera phones 300A and 300B, for example during a video chat session. In some embodiments, the processor 292 also analyzes the audio information from the video chat session. In some embodiments, the processor 292 converts the audio information into a text string.

In some embodiments the processor 292 analyzes the pixel data in order to detect faces in one or more customer images using a variety of known face detection algorithms. Such algorithms are described, for example, in a paper by Degtyarev et al. entitled "Comparative testing of face detection algorithms" (Proc. 4th International Conference on Image and Signal Processing, pp. 200-209, 2010), which is incorporated herein by reference. In some embodiments, the face detection algorithm determines the smile size and excitement level of the person depicted in the video chat. In some embodiments, a face recognition algorithm is used to determine the name of the people depicted in the shared customer images or the video chat session. In some embodiments, the detected faces can be analyzed to estimate approximate ages for the persons. It will be understood that the term approximate age, as used herein, relates to categorizing one or more faces into broad, age-related categories. These approximate age categories can include, for example, babies, young children, teens, younger adults, and older adults (i.e., senior citizens).

In some embodiments, the processor 292 in the computer system 286 can analyze the pixel data of some of the customer images in order to determine whether one or more key highlights are depicted in the images. For example, whether the scene includes a birthday cake for a birthday event, or whether it includes a referee indicating a touchdown, for a football game event. Such image recognition algorithms are used, for example, in the Google Goggles Application (APP) for the Android mobile platform, which is available from Google of Mountain View, Calif.

In some embodiments, the processor 292 in the computer system 286 creates a multimedia product for a particular user of one of the camera phones 300A, 300B by incorporating both shared images and images or audio information captured during a video chat session. In some embodiments, the multimedia product is automatically created by placing one or more captured and shared images in predetermined locations in the product, and including information from the video chat session. For example, a first image of a key play taken during a child's baseball game can be shared with a grandparent, and a second image, of the child describing the key play can be captured during a video chat session. These two images can be used as part of a multimedia product which will be treasured by the grandparent.

In some embodiments, the processor 292 in the computer system 286 modifies the appearance of one or more of the captured digital images, so that it has a more suitable appearance when incorporated into the photo product. For example, in some embodiments, faces present in the video chat session can be detected, and the processor 292 can crop the digital image to enlarge the size of the faces and remove some of the distracting background surrounding the face.

In some embodiments, captured digital images can be processed by the processor 292 to provide a different image appearance. For example, captured digital images can be processed to provide an image having a different color tint, contrast, or boundary shape, so that it has a more suitable appearance when positioned in the multimedia product.

The communication network 250 enables communication with a fulfillment provider 270. The fulfillment provider 270 produces and distributes multimedia products. The fulfillment provider 270 includes a web server 272, and a computer system 276 that further includes a commerce manager 274 and a fulfillment manager 275. Fulfillment requests received from service provider 280 are handled by the commerce manager 274 initially before handing the requests off to the fulfillment manager 275. The fulfillment manager 275 determines which equipment is to be used to fulfill the ordered good(s) or services which can serve as the multimedia products, such as a digital printer 278 or a DVD writer 279. The digital printer 278 can be any of a wide range of different types of color hardcopy printers that can produce printed images and various printed photo products, (e.g., photo albums and photo calendars). The printed images can be of various sizes, including "poster prints", and in some embodiments can be sold in frames. The DVD writer 279 can produce CDs or DVDs, for example PictureCDs, having digital still and video images and application software for using the digital images.

After fulfillment, the multimedia products are provided to the user of the camera phones 300A and 300B, or to a recipient designated by the user of the camera phones 300A and 300B. In some embodiments, the multimedia products are provided using a transportation vehicle 268. In other embodiments, the multimedia products are provided at a retail outlet, for pickup by the user of the camera phones 300A and 300B, or by a designated recipient.

In some embodiments, the system 214 also includes one or more kiosk printers 224 that communicate with the communication network 250 and service provider 280 via a communication service provider (CSP) 222. This enables the multimedia products, such as printed photo products, created by the service provider 280 using digital images captured by camera phones 300A and 300B, to be provided at retail establishments.

In some embodiments, the system 214 also includes one or more customer computers 218 that communicate with the communication network 250 and service provider 280 via communication service provider (CSP) 220. This enables multimedia products, such as photo products, created by the service provider 280 using digital images captured by camera phones 300A and 300B and information from the video chat session, to be ordered at a later time by the user of the camera phones 300A and 300B, or by others who are authorized by the user of the camera phones 300A and 300B.

It will be understood that in some embodiments, a plurality of service providers 280, fulfillment providers 270 or kiosk printers 224 can be located at a plurality of different retail outlets. For example, fulfillment providers 270 can be located in stores that are near vacation spots or other attractions. In some embodiments, the user of the camera phones 300A and 300B can be guided to the location of a nearby fulfillment provider 270 in order to pick up a photo product that has been produced using their captured digital images. In some embodiments, the user of the camera phones 300A and 300B receives the photo product at a discount, or free of charge, in order to encourage the user to enter the store where they will potentially purchase other items. In some embodiments, the photo product includes advertising content relating to merchants which are located near the location of the fulfillment provider 270.

In some embodiments, the service provider 280, or the fulfillment provider 270 can create examples of various multimedia products that can be provided by the fulfillment provider 270, as described in commonly-assigned U.S. Pat. No. 6,915,723, entitled "Method For Providing Customized Photo Products Over A Network," by Parulski et al., the disclosure of which is incorporated herein by reference. The examples can be communicated to the camera phones 300A and 300B, or to the customer computer 218, where the examples can be displayed to the user.

In some embodiments, the customer database 288 at the service provider 280 includes information describing customer accounts for a plurality of users, including user billing information. The billing information can include a payment identifier for the user, such as a charge card number, expiration date, user billing address, or any other suitable identifier. In some embodiments, the customer database 288 also provides long-term storage of the uploaded images for some or all of the users. In some embodiments, stored images are accessible (e.g., viewable) via the Internet by authorized users. Users can be authorized to view, print, or share images as described in commonly-assigned U.S. Pat. No. 5,760,917, entitled "Image distribution method and system," to Sheridan, the disclosure of which is incorporated herein by reference.

When a multimedia product, such as a photo product, is purchased by the user of the camera phones 300A and 300B, the service provider account manager 284 can communicate with a remote financial institution (not shown) to verify that the payment identifier (e.g., credit card or debit card number) provided by the customer is valid, and to debit the account for the purchase. Alternatively, the price of the photo product can be added to the user's monthly bill paid to the service provider 280 or to their mobile phone operator.

It will be understood that in some embodiments, the functions of the service provider 280 and the fulfillment provider 270 can be combined, for example, by using a common web server for both web server 282 and web server 272, or by combining the functions of the account manager 284, the commerce manager 274, and the fulfillment manager 275. It will be understood that in some embodiments, the customer database 288 or the custom content database 290 can be distributed over several computers at the same physical site, or at different sites.

Figure 2:
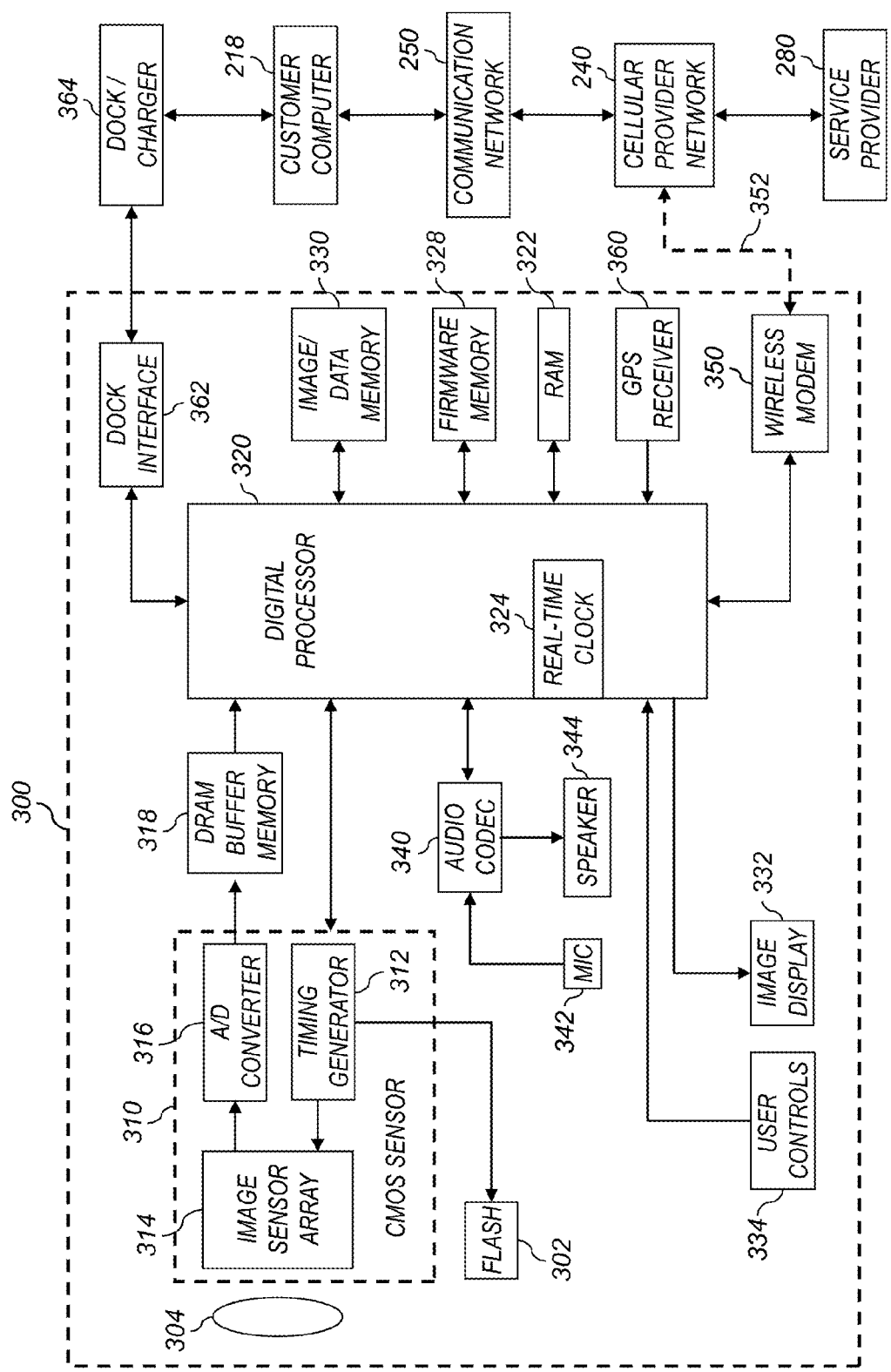
FIG. 2 is a block diagram of a camera phone used in the digital imaging system of FIG. 1.

FIG. 2 depicts a block diagram of a camera phone 300 that can be used for the camera phones 300A and 200B in the digital photography system of FIG. 1. The camera phone 300 can send and receive email messages and text messages which include images and can conduct video chat sessions. The camera phone 300 can be, for example, an iPhone 4 sold by Apple Inc., of Cupertino Calif., which can capture and share still and video images, and can conduct video chats session using the FaceTime application. Alternately, it will be understood that other types of image capture devices, such as a wireless digital camera, or a tablet computer (e.g., an iPad sold by Apple Inc.) can be used in the system 214 described in reference to FIG. 1. The camera phone 300 or other type of image capture device can also include other functions, including, but not limited to, the functions of a telephone, a digital music player (e.g., an MP3 player), a GPS receiver, or a programmable digital assistant (PDA).

The camera phone 300 is a portable battery operated device, small enough to be easily handheld by a user when capturing and reviewing images. The camera phone 300 includes a lens 304 which focuses light from a scene (not shown) onto an image sensor array 314 of a CMOS image sensor 310. The image sensor array 314 can provide color image information using the well-known Bayer color filter pattern, or any other appropriate color filter pattern. The image sensor array 314 is controlled by timing generator 312, which also controls a flash 302 in order to illuminate the scene when the ambient illumination is low. The image sensor array 314 includes an array of light sensitive pixels, and can be of various resolutions (e.g., 2560 columns×1920 rows of pixels).

In some embodiments, the camera phone 300 can also produce video clips having a lower resolution than the image sensor array 314 by summing multiple pixels of the image sensor array 314 together (e.g., summing pixels of the same color within each 4 column×4 row area of the image sensor array 314) to create a lower resolution video image frame. The video image frames are read from the image sensor array 314 at regular intervals, for example using a 30 frame/second readout rate.

The analog output signals from the image sensor array 314 are amplified and converted to digital data by an analog-to-digital (A/D) converter circuit 316 on the CMOS image sensor 310. The digital data is stored in a DRAM buffer memory 318 and subsequently processed by a digital processor 320 controlled by firmware stored in firmware memory 328, which can be, for example, flash EPROM memory. The digital processor 320 includes a real-time clock 324, which keeps the date and time even when the camera phone 300 and digital processor 320 are in a low power or "off" state. The digital processor 320 processes digital image data provided by the CMOS image sensor 310 and produces digital images that are stored as digital image files using image/data memory 330. The phrase "digital image" or "digital image file", as used herein, refers to any digital image file, such as a digital still image file or a digital video image file.

The processed digital image files are stored in the image/data memory 330, along with associated metadata. The metadata can include, for example, the date/time that the image was captured provided by the real-time clock 324 and location information provided by GPS receiver 360. The image/data memory 330 can also be used to store other information, such as phone numbers or appointments. In some embodiments, the camera phone 300 is a smart phone, and the digital processor 320 uses a software stack, such as Android, which includes an operating system, middleware, and applications. This permits a software application (i.e., an "APP") to be downloaded, stored in the firmware memory 328, and used to provide various functions.

In some embodiments, the digital processor 320 performs color interpolation followed by color and tone correction, in order to produce rendered sRGB image data. In some embodiments, the digital processor 320 can also provide various image sizes that can be selected by the user using appropriate user controls 334. In some embodiments, rendered sRGB image data is then JPEG compressed and stored as a JPEG image file in the image/data memory 330. In some embodiments, the JPEG file uses the well-known "Exif" image format. This format includes an Exif application segment that stores particular image metadata using various TIFF tags. Separate TIFF tags are used to store the date and time the picture was captured and the GPS co-ordinates, as well as other camera settings such as the lens F/#.

In some embodiments, the digital processor 320 also creates a low-resolution "thumbnail" size image, which can be created as described in commonly-assigned U.S. Pat. No. 5,164,831 to Kuchta, et al., entitled "Electronic still camera providing multi-format storage of full and reduced resolution images," the disclosure of which is herein incorporated by reference. The thumbnail image can be stored in RAM memory 322 and supplied to a color image display 332, which can be, for example, an active matrix LCD display or an organic light emitting diode (OLED) display. After images are captured, they can be quickly reviewed on the image display 332 by using the thumbnail image data.

In a preferred embodiment, a graphical user interface displayed on the image display 332 is controlled by user controls 334. The graphical user interface enables the user to control the functions of the camera phone 300, for example, to capture still or video images, to send or view text messages or email messages, or to initiate a video chat session. User controls 334 typically include some combination of buttons, rocker switches, joysticks or touch sensitive surfaces. In some embodiments, many of the user controls 334 are provided by using a touch screen overlay on the image display 332. In other embodiments, the user controls 334 can include a means to receive input from the user or an external device via a tethered, wireless, voice activated, visual or other interface. In other embodiments, additional status displays or images displays can be used.

An audio codec 340 connected to the digital processor 320 receives an audio signal from a microphone 342 and provides an audio signal to a speaker 344. These components can be used for telephone conversations and video chat sessions, and can also be used to record and playback an audio track, along with a video sequence or still image. The speaker 344 can also be used to inform the user of an incoming phone call. This can be done using a standard ring tone stored in firmware memory 328, or by using a custom ring-tone downloaded from service provider 280. In addition, a vibration device (not shown) can be used to provide a silent (e.g., non audible) notification of an incoming phone call, e-mail, or text message.

A dock interface 362 can be used to connect the camera phone 300 to a dock/charger 364, which is connected to customer computer 218. The dock interface 362 can conform to, for example, the well-know USB interface specification. Alternatively, the interface between the digital camera phone 300 and customer computer 218, can be a wireless interface, such as the well-known Bluetooth wireless interface or the well-know 802.11b wireless interface. The dock interface 362 can be used to download image files (which include metadata such as the capture date/time and capture location GPS coordinates) from the image/data memory 330 to the customer computer 218. The dock/charger 364 can also be used to recharge the batteries (not shown) in the camera phone 300.

The camera phone 300 includes a communication system that enables the camera phone 300 to communicate across communication network 250. In a preferred embodiment, the communication system includes a wireless modem 350, which communicates with the digital processor 320 and enables the camera phone 300 to transmit and receive information via an RF channel 352. The wireless modem 350 communicates over a radio frequency (e.g., wireless) link with the cellular provider network 240, which can utilize, for example, a CDMA network, a 3GSM, a 4GSM network, or other wireless communication networks.

It will be understood that the functions of digital processor 320 can be provided using a single programmable processor or by using multiple programmable processors, including one or more digital signal processor (DSP) devices. Alternatively, the digital processor 320 can be provided by custom circuitry (e.g., by one or more custom integrated circuits (ICs) designed specifically for use in camera phones), or by a combination of programmable processor(s) and custom circuits. It will be understood that connectors between the digital processor 320 from some or all of the various components shown in FIG. 2 can be made using a common data bus. For example, in some embodiments the connection between the digital processor 320, the DRAM buffer memory 318, the image/data memory 330 and the firmware memory 328 can be made using a common data bus.

Figure 3:
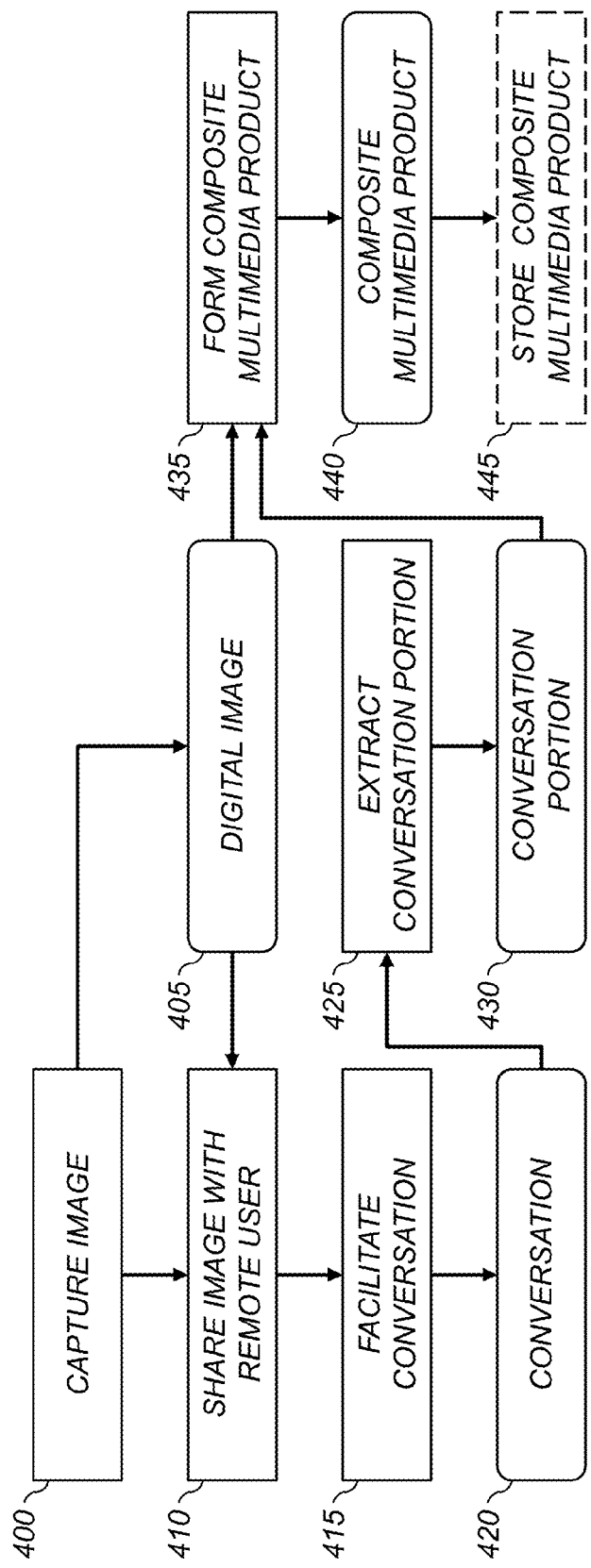
FIG. 3 is a high level flow diagram depicting steps for forming a multimedia product using video chat in accordance with the present invention.

FIG. 3 is a high level flow diagram depicting steps for forming a composite multimedia product 440 in accordance with the present invention. In a capture image step 400, a local user captures a digital image 405 (e.g., a still or video image) using an image capture device, such as camera phone 300A (FIG. 1).

In a share image with remote user step 410, the local user shares the captured digital image 405 with a remote user, such as the user of camera phone 300B (FIG. 1). The share image with remote user step 410 can share the digital image 405 using any method known in the art to transmit data to a remote user. For example, the digital image 405 can be shared as a "picture text" or can be sent as an Email message.

In a facilitate conversation step 415, a conversation 420 is facilitated between the local user (e.g., the user of the camera phone 300A) and the remote user (e.g., the user of the camera phone 300B) pertaining to the shared digital image 405. In a preferred embodiment, the conversation 420 is a video chat session. In this case, the conversation 420 can be facilitated by accepting a request received from the remote user's camera phone 300B to begin a video chat session. In other embodiments, the conversation 420 can be an audio interchange (e.g., a phone call). In this case, the conversation 420 can be facilitated by accepting an incoming phone call. In various scenarios, the conversation can be initiated by either the remote user or the local user.

The conversation 420 is recorded, at least temporarily, to capture the actions and reactions of the local user and the remote user during the video chat session. The recorded conversation is processed using an extract conversation portion step 425 to automatically extract at least one conversation portion 430 from the conversation 420 that is relevant to the shared digital image 405. The conversation portion 430 preferably includes "key segment" content determined by automatically analyzing the conversation 420, and can be represented using a video clip, a still image, an audio segment, text extracted from the audio segment, or combinations thereof.

A form composite multimedia product step 435 forms a composite multimedia product 440 by combining the digital image 405 with the extracted conversation portion 430. The inclusion of the conversation portion 430 provides a mechanism for the interactions that occur between the users during the conversation to become a part of the recorded story of an event. In this way, the composite multimedia product 440 can capture reactions and emotions of the users during their interactions pertaining to the digital image 405.

In some cases, other media content can also be included in the composite multimedia product 440. For example, additional digital images can also be included, such as images that may be relevant to the digital image 405 or the conversation 420. In some embodiments, additional content can be included from content libraries. The additional content could include graphics templates, stock photos/video clips/audio clips and background music.

A representation of the resulting composite multimedia product 440 is optionally stored in a processor-accessible memory using a store composite multimedia product step 445. In some cases, the representation of the composite multimedia product 440 can be the actual product itself (e.g., a composite multimedia image stored in a JPEG image format or a multimedia slideshow stored in a DVD format). In some cases, the representation of the composite multimedia product 440 may be a digital image file that stores a composite digital image that will be printed at a fulfillment provider 270 (FIG. 1) to form a printed multimedia product. In other cases, the representation of the composite multimedia product 440 can be a set of instructions that can be used to produce the composite multimedia product 440 (e.g., information identifying the various multi-media components that will be combined to form the composite multimedia product 440, together with instructions specifying how they should be combined). The stored set of instructions can then be provided to the fulfillment provider 270 for fulfillment of the desired composite multimedia product.

In some embodiments, some or all of the steps described in reference to FIG. 3 can be provided by an image capture device, such as a camera phone 300 (FIG. 2). In some embodiments, the camera phone 300 is a smart phone, and a service provider 280 (FIG. 1) provides a downloadable software application (e.g., an "APP") over the communication network 250 to the camera phone 300. The software application can then be executed using the digital processor 320 in the camera phone 300. In some embodiments, some of the steps in FIG. 3 can be performed using a software application executed using another data processing system such as customer computer 218, computer system 276 associated with fulfillment provider 270, or computer system 286 associated with service provider 280.

To illustrate the method of FIG. 3, consider an example where a mother uses her camera phone 300A (FIG. 1) to capture a still digital image 405 of her child waiting at the bus stop on the first day of school. The mother can then share the captured digital image 405 with the child's grandmother in another city, and with the child's father who in his office. The grandmother or father can then respond by initiating a conversation 420 (e.g., a FaceTime video chat) with the child via the mother's camera phone 300A and the remote user's camera phone 300B. The video images and audio from the video chat are temporarily recorded, and key content is extracted using any of the well-known "key frame extraction" methods that have been disclosed in the art. One example of a key frame extraction process that can be used in accordance with the present invention has been described by Kumar et al. in the article "Key frame extraction from consumer videos using sparse representation" (Proc. 18th IEEE International Conference on Image Processing, pp. 2437-2440, 2011), which is incorporated herein by reference. Another such key frame extraction process has been described by Papin et al. in the article "Intelligent key frame extraction from unstructured consumer video clips" (Visual Communications and Image Processing, Proc. SPIE Vol. 6508, pp. 65082D, 2007), which is incorporated herein by reference.

The key frame extraction process can include analyzing the faces and voices of the users in the video chat for smiles or excitement levels. The conversation 420 can include, for example, the video image and audio of the child telling the grandmother about new dress which is shown in the image that was shared. The conversation portion 430 corresponding to the extracted key content then extracted using the extract conversation portion step 425 and used to create a digital or printed photo product, such as a "photo book" or a multimedia file. The multimedia file can use, for example, the Storyshare format described in commonly-assigned, U.S. Patent Application Publication 2008/0215984 to Manico, et. al, entitled "Storyshare automation", the disclosure of which is incorporated herein by reference.

Figure 4:
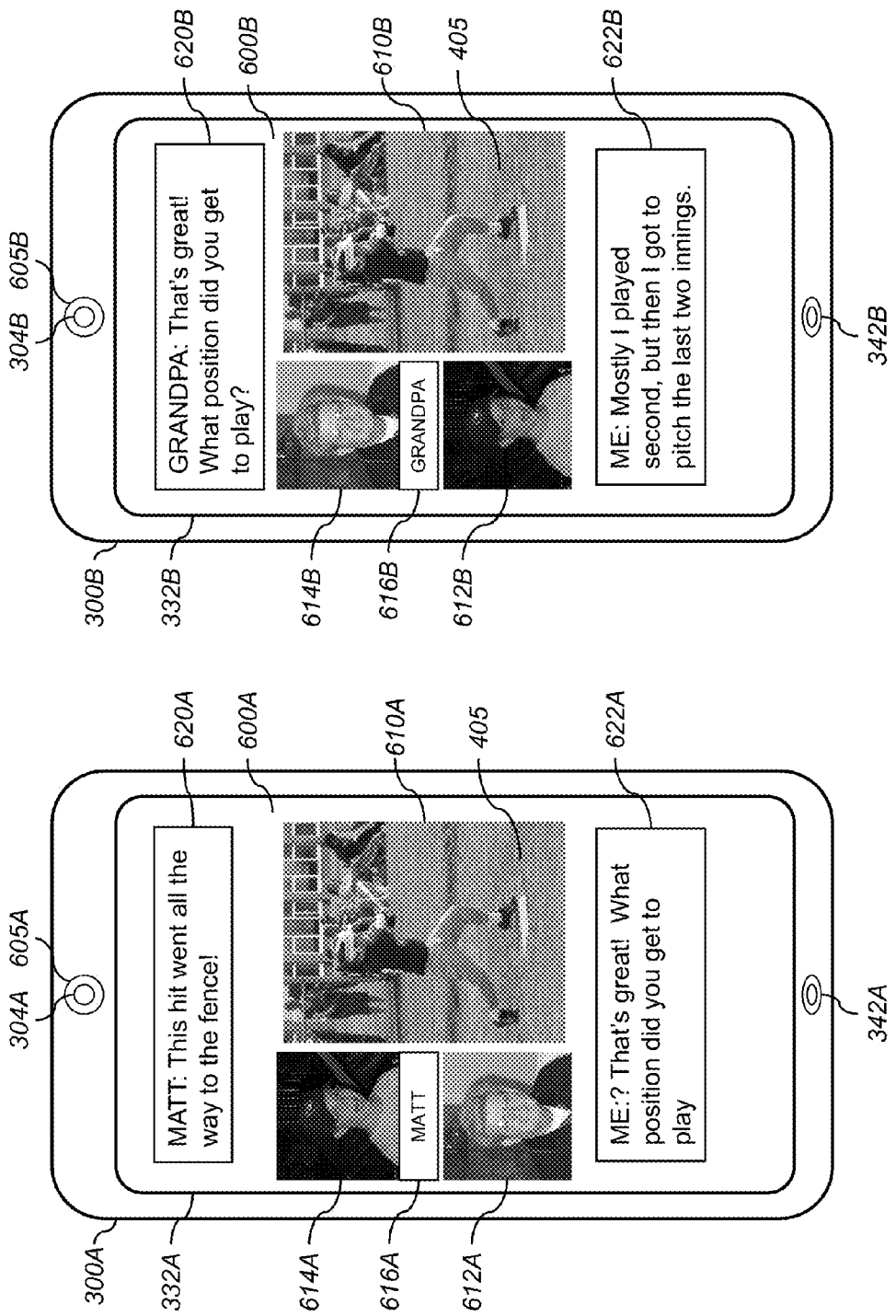
FIGS. 4A and 4B depict camera phone user interface screens for two users who are conducting a video chat session.

As another example, consider FIGS. 4A and 4B, which depict user interface screens for camera phones 300A and 300B associated with two users, Grandpa and Matt, who are conducting a video chat session to discuss a shared digital image 405 that Matt had shared with Grandpa. FIG. 4A depicts a user interface screen 600A displayed on image display 332A on the camera phone 300A used by Grandpa, and FIG. 4B depicts a user interface screen 600B displayed on image display 332B on the camera phone 300B used by Matt.

The camera phone 300A shown in FIG. 4A includes a microphone 342A which is used for recording Grandpa's speech, and a front-facing digital camera 605A including a lens 304A which is used for capturing video images of Grandpa. The user interface screen 600A on the camera phone 300A includes a shared image section 610A for displaying the shared digital image 405, a user section 612A for displaying the video image of the user (Grandpa) captured using the digital camera 605A, and a remote user section 614A for displaying the video image of the remote user (Matt) transmitted from the camera phone 300B during the video chat session. A remote user identifier section 616A displays a text string identifying the name of the remote user (Matt) participating in the video chat.

The user interface screen 600A of the first camera phone 300A includes an upper text section 620A that displays a recent message "This hit went all the way to the fence" received from the remote user (Matt) of camera phone 300B, which pertains to the shared digital image 405 displayed in shared image section 610A. The user interface screen 600A also includes a lower text section 622A, which displays a recent message ("That's great! What position did you get to play?") sent to the user (Matt) of camera phone 300B.

In a preferred embodiment, the messages displayed in the upper text section 620A and the lower text section 622A are text strings provided by automatically analyzing the audio signal of the video chat using a speech-to-text conversion algorithm, such as the well-known SIRI (Speech Interpretation and Recognition Interface) provided with the Apple iPhone 4S smart phone. In some embodiments, the messages displayed in upper text section 620A and lower text section 622A are text messages provided by the user, for example by typing a message using a slide-out keyboard (not shown) on the camera phones 300A and 300B. In other embodiments, the user interface screen 600A does not include upper text section 620A and the lower text section 622A.

Similarly, the camera phone 300B shown in FIG. 4B includes a microphone 342B which is used for recording Matt's speech, and a front-facing digital camera 605B including a lens 304B which is used for capturing video images of Matt. The user interface screen 600B on the camera phone 300B includes a shared image section 610B for displaying the shared digital image 405, a user section 612B for displaying the video image of the user (Matt) captured using the digital camera 605B, and a remote user section 614B for displaying the video image of the remote user (Grandpa) transmitted from the camera phone 300A during the video chat session. A remote user identifier section 616B displays a text string identifying the name of the remote user (Grandpa) participating in the video chat.

The user interface screen 600B of the second camera phone 300B includes an upper text section 620B that displays a recent message "That's great! What position did you get to play?" received from the remote user (Grandpa) of camera phone 300A, which pertains to the shared digital image 405 displayed in shared image section 610B. The user interface screen 600B also includes a lower text section 622B, which displays a recent message ("Mostly I played second, but then I got to pitch the last two innings") sent to the user (Grandpa) of camera phone 300A.

Returning to a discussion of FIG. 3, the extract conversation portion step 425, can use a variety of different methods to extract the conversation portion 430 from the conversation 420. In some embodiments, the pixel data of the video images in the conversation 420 (i.e., the video chat session) are analyzed using one or more digital image analysis techniques, in order to determine which portion of the conversation is most relevant to the shared digital image. These digital image analysis techniques can include, for example, well-known image analysis methods such as semantic analysis, feature point identification, color map identification, facial identification, facial recognition, age recognition, and color or light balance analysis. In some embodiments, the facial expressions of the users are analyzed to determine their smile sizes or excitement levels. The portion of the conversation 420 where one or both of the users have the largest smiles or are the most excited can be used to define the conversation portion 430. In some embodiments, the image analysis of the video images is performed by the digital processor 320 (FIG. 2) in one or both of the camera phones 300A or 300B (FIG. 1). In other embodiments, the image analysis can be performed by the processor 292 (FIG. 1) in the computer system 286 of the service provider 280.

In some embodiments, digital audio analysis techniques are used to analyze an audio signal associated with the conversation 420 to determine which portion of the conversation 420 is most relevant to the shared digital image. In some embodiments, the sound level and excitement level of the users' voices during the conversation 420 are analyzed to identify the portion where one or both of the users have a loud sound level or high excitement level. In some embodiments, text strings provided by automatically analyzing the audio signal are analyzed to detect key words or phrases. For example, the key words or phrases relate to a subject of the digital image 405 that is determined by using semantic analysis to analyze the digital image 405. For example, if semantic analysis determines that the subject of the digital image 405 in FIG. 4A is a batter in a baseball game, then the key word "hit" would indicate that the associated conversation portion 430 is relevant to the digital image 405.

Figure 5:
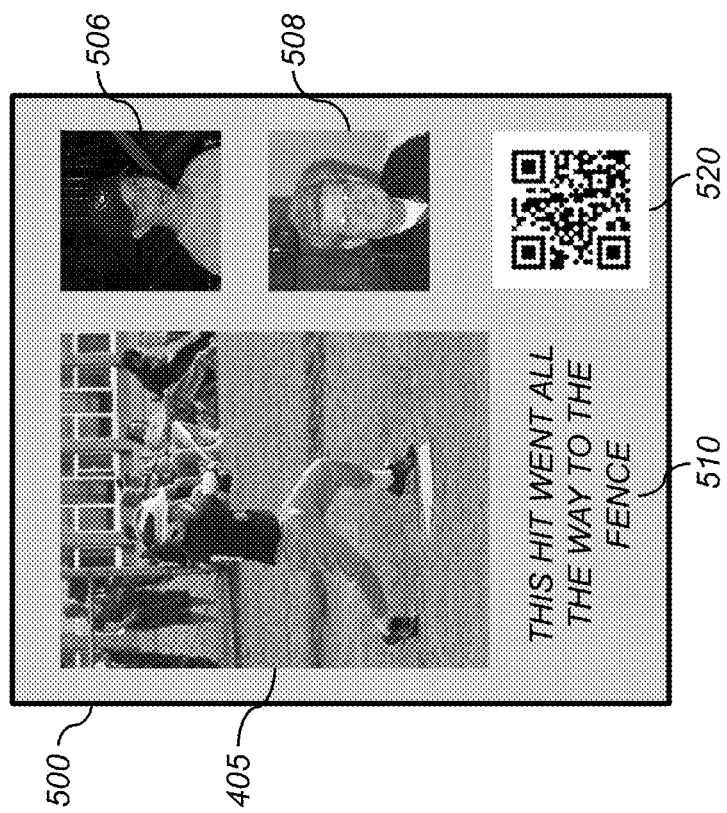
FIG. 5 depicts an example of a printed multimedia product.
Figure 6:
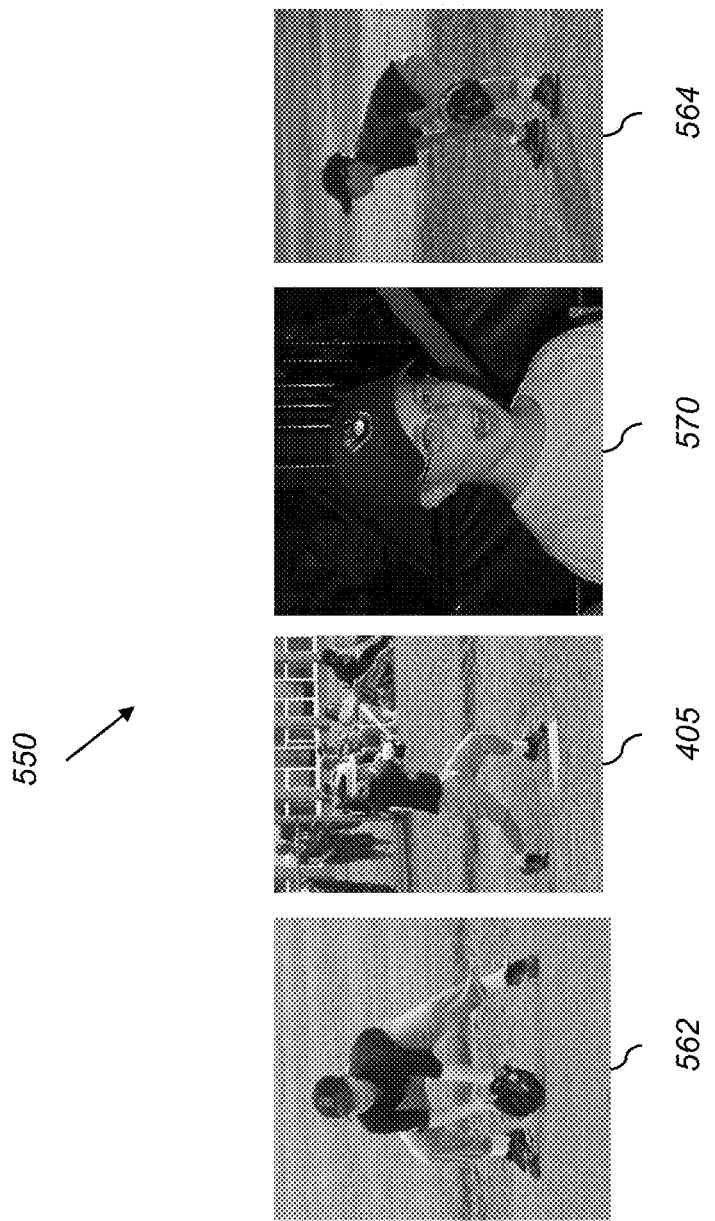
FIG. 6 depicts an example of a multimedia slideshow.

There are many ways that the form composite multimedia product step 435 (FIG. 3), can form the composite multimedia product 440 by combining the digital image 405 and the extracted conversation portion 430. FIGS. 5 and 6 depict examples of two different composite multimedia products 440 that can be formed in accordance with the present invention.

FIG. 5 depicts an example of a printed multimedia product 500, which can be, for example, a single print (e.g., an 8×10 inch print) or a page from a photo album. The printed multimedia product 500 includes a representation of the shared digital image 405 from the example scenario discussed with reference to FIGS. 4A and 4B, together with a text string 510 derived from the conversation portion 430 extracted from the conversation 420 (i.e., the video chat session). The printed multimedia product 500 also includes a first user image 506 of Matt (the user of the camera phone 300B) which was extracted from the video image captured by the digital camera 605B during the video chat session, and a second user image 508 of Grandpa (the user of the camera phone 300A) which was extracted from the video image captured by the digital camera 605A during the video chat session. The printed multimedia product 500 also includes a machine readable code 520, which provides a link to a video clip stored on a network server corresponding to the extracted conversation portion 430 of the video chat session, where Matt is describing his hit, and saying in an excited voice "This hit went all the way to the fence".

The exemplary machine readable code 520 shown in FIG. 5 is a well-known QR (Quick Response) code, which is readable by many camera phones. The code consists of modules which are arranged in a square pattern on a white background. In this example, the information encoded in the QR code is a link to a website, such as YouTube, which permits the video clip corresponding to the extracted conversation portion 430 to be viewed on a smart phone. It will be understood that QR codes could also be used to provide electronic access to images (e.g., the image file associated with the digital image 405) and other associated information stored on a network server (e.g., in the customer database 288 shown in FIG. 1).

In some embodiments, additional content can also be included in the printed multimedia product 500, such as other digital images from the user's digital media collection or stock images/graphics (e.g., clip art) from a custom content database 290 (FIG. 1)). In some embodiments, semantic analysis can be used to analyze the digital image 405 or the video chat to determine a relevant subject and automatically suggest appropriate supplemental content such as stock images/graphics that are relevant to the digital image 405. In other embodiments, a user interface can be provided to allow the user to manually search through the user's digital media collection or libraries of available supplemental content to select other media elements that should be included in the printed multimedia product 500. For example, the user interface could enable the user to search for baseball themed clip art.

FIG. 6 depicts an example of multimedia slideshow 550, which is a form of a composite multimedia product 440 (FIG. 3). The multimedia slideshow 550 includes the shared digital image 405, together with a number of other related digital images 562 and 564 captured during the same baseball game, and a video clip 570 corresponding to the conversation portion 430 extracted from the video chat session which shows Matt describing the hit he made during the game, which is depicted in the related digital image 405. In some embodiments, an audio soundtrack can be associated with the multimedia slideshow 550 that could include audio segments extracted from the conversation 420 (FIG. 3) or background music. For example, since the multimedia slideshow 550 relates to a baseball game, an audio clip of "Take me out to the ballgame" can be used for background music. In some embodiments, semantic analysis can be used to analyze the digital image 405 or the video chat to determine a relevant subject and automatically suggest appropriate supplemental content such as background music and stock images/graphics that are relevant to the digital image 405. In other embodiments, a user interface can be provided to allow the user to manually search through the user's digital media collection or libraries of available supplemental content to select other media elements that should be included in the multimedia slideshow 550.

The multimedia slideshow 550 can be provided to a customer (e.g., the user of the camera phone 300A or the user of the camera phone 300B) in a variety of different forms. In some embodiments, the multimedia slideshow 550 is adapted to be viewed on the image display 332A of the camera phone 300A (FIG. 4A), or the image display 332B of the camera phone 300B (FIG. 4B). In other embodiments, the multimedia slideshow 550 can be made available for viewing on other devices (e.g., customer computer 218 (FIG. 1) or a digital picture frame) or can be stored in the customer database 288 (FIG. 1) of a service provider 280 (e.g., Kodak Gallery or Facebook) so that it can be viewed over the Internet or can be shared with friends. In some embodiments the multimedia slideshow 550 can be transmitted to a fulfillment provider 270 (FIG. 1) and used to make a product such as a DVD.

In some embodiments, the composite multimedia product 440 (FIG. 3) can be formed by storing the extracted conversation portion 430 as metadata associated with the digital image 405. For example, the digital image 405 can be stored in a digital image file using the well-known Exif file format, and extracted video content, extracted audio content or extracted text content associated with the conversation portion 430 can be stored as metadata in Exif application segments. Applications that are enabled to interpret the metadata can then access the supplementary content and show it or play it for the user.

In some embodiments, the user of the camera phone 300A (FIG. 1) or the camera phone 300B can manually initiate the process of forming the composite multimedia product 440 (FIG. 3). For example, a user control can be provided in the video chat application that can be activated to initiate the formation of the composite multimedia product 440. In other embodiments when an application running on the camera phone 300A detects that the user has participated in a video chat is response to the sharing of a digital image 405 with a remote user, the application can automatically suggest one or more composite multimedia products that the user might be interested in creating. For example, the application can show the user a preview of the printed multimedia product 500 (FIG. 5) and ask the user if he/she would like to order one from a fulfillment provider 270 (FIG. 1).

In the foregoing detailed description, the method and apparatus of the present invention have been described with reference to specific exemplary embodiments thereof. It will, however, be evident that various modifications and changes can be made thereto without departing from the broader spirit and scope of the present invention. The present specification and figures are accordingly to be regarded as illustrative rather than restrictive.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST 214 system
218 customer computer
220 communication services provider
222 communication services provider
224 kiosk printer
240 cellular provider network
250 communication network
268 transportation vehicle
270 fulfillment provider
272 web server
274 commerce manager
275 fulfillment manager
276 computer system
278 digital printer
279 DVD writer
280 service provider
282 web server
284 account manager
286 computer system
288 customer database
290 custom content database
292 processor
300, 300A, 300B camera phone
302 flash
304, 304A, 304B lens
310 CMOS image sensor
312 timing generator
314 image sensor array
316 A/D converter
318 DRAM buffer memory
320 digital processor
322 RAM memory
324 real-time clock
328 firmware memory
330 image/data memory
332, 332A, 332B image display
334 user controls
340 audio codec
342, 342A, 342B microphone
344 speaker
350 wireless modem
352 RF channel
360 GPS receiver
362 dock interface
364 dock recharger
400 capture image step
405 digital image
410 share image with remote user step
415 facilitate conversation step
420 conversation
425 extract conversation portion step
430 conversation portion
435 form composite multimedia product step
440 composite multimedia product
445 store composite multimedia product step
500 printed multimedia product
506 first user image
508 second user image
510 text string
520 machine readable code
550 multimedia slideshow
562 digital image
564 digital image
570 video clip
600A, 600B user interface screen
605A, 605B digital camera
610A, 610B shared image section
612A, 612B user section
614A, 614B remote user section
616A, 616V remote user identifier section
620A, 620B upper text section
622A, 622B lower text section

The invention claimed is:

1. A method for forming a composite multimedia product, comprising:
   capturing a digital image of a scene;
   sharing the digital image with a remote user;
   facilitating a conversation with the remote user across a communication network, the conversation pertaining to the shared digital image, wherein the conversation with the remote user across the communication network comprises a video chat conversation;
   automatically extracting a portion of the conversation that is relevant to the shared digital image; and
   forming the composite multimedia product by combining the digital image and the extracted portion of the conversation, wherein the extracted portion of the conversation comprises an audio segment extracted from the conversation, and wherein the composite multimedia product comprises the digital image and the audio segment extracted from the conversation, wherein the composite multimedia product further comprises a first digital image of a first video chat participant and a second digital image of a second video chat participant;
   wherein the method is performed at least in part using a data processor.

2. The method of claim 1, wherein said forming of the composite multimedia product includes storing the audio segment extracted from the conversation as metadata associated with the digital image.

3. The method of claim 1, wherein the composite multimedia product is stored using a story share format.

4. The method of claim 1, wherein the composite multimedia product includes a multimedia slideshow.

5. The method of claim 4, wherein the multimedia slideshow includes a representation of the digital image together with at least one of video content extracted from the conversation, audio content extracted from the conversation, or text content extracted from the conversation.

6. The method of claim 1, wherein the composite multimedia product comprises an image component portion and a metadata component portion combined into a single data file.

7. The method of claim 6, further comprising presenting on a user interface a preview of a product including the image component portion and the metadata component portion of the composite multimedia product.

8. The method of claim 1, wherein the composite multimedia product comprises a combination of still images and video clips.

9. The method of claim 1, wherein the composite multimedia product comprises a still image portion, a video clip portion, and a metadata portion.

10. The method of claim 1, wherein the automatically extracting a portion of the conversation that is relevant to the shared digital image comprises analyzing the conversation to identify portions where a user exhibits a loudest sound level or a highest excitement level.

11. The method of claim 1, wherein the automatically extracting a portion of the conversation that is relevant to the shared digital image comprises:
    analyzing facial expressions of users in the video chat conversation; and
    identifying portions of the video chat conversation where the user exhibits a highest excitement level based on the facial expressions.

12. The method of claim 11, wherein the forming the composite multimedia product further comprises a video clip from the video chat conversation corresponding to an identified portion of the video chat conversation where the user exhibited a highest excitement level.

13. The method of claim 1, wherein the composite multimedia product further comprises a first text portion and a second text portion, wherein the first text portion comprises a textual representation of a portion of the conversation spoken by a first chat participant, and wherein the second text portion comprises a textual representation of a portion of the conversation spoken by a second chat participant.

14. The method of claim 1, further comprising:
    detecting participation in the conversation; and
    automatically suggesting a plurality of composite multimedia products, wherein the plurality of composite multimedia products comprises the composite multimedia product.

15. The method of claim 1, further comprising automatically converting the extracted portion of the conversation into text, wherein said forming the composite multimedia product comprises combining the digital image, the extracted portion of the conversation, and the text, and wherein the composite multimedia product comprises the text.

16. A computer program product for forming a composite multimedia product comprising a non-transitory tangible computer readable storage medium storing an executable software application for causing a data processing system to perform operations comprising:
    capturing a digital image of a scene;
    sharing the digital image with a remote user;
    facilitating a conversation with the remote user pertaining to the shared digital image, wherein the conversation with the remote user across the communication network comprises a video chat conversation;
    automatically extracting a portion of the conversation that is relevant to the shared digital image; and
    forming the composite multimedia product by combining the digital image and the extracted portion of the conversation, wherein the extracted portion of the conversation comprises an audio segment extracted from the conversation, and wherein the composite multimedia product comprises the digital image and the audio segment extracted from the conversation, and wherein the composite multimedia product further comprises a first digital image of a first video chat participant and a second digital image of a second video chat participant.

17. An image capture device, comprising:
    an image sensor configured to capture a digital image;
    an optical system configured to form an image of a scene onto the image sensor;
    a data processing system;
    a communication system configured to communicate across a communication network;
    a storage memory configured to store captured images; and
    a program memory communicatively connected to the data processing system and storing instructions configured to cause the data processing system to implement a method for forming a composite multimedia product, wherein the method includes:
        capturing a digital image of a scene using the image sensor;
        using the communication system to share the digital image with a remote user;
        facilitating a conversation with the remote user across the communication network, wherein the conversation pertains to the shared digital image, wherein the conversation with the remote user across the communication network comprises a video chat conversation;

automatically extracting a portion of the conversation that is relevant to the shared digital image; and forming the composite multimedia product by combining the digital image and the extracted portion of the conversation, wherein the extracted portion of the conversation comprises an audio segment extracted from the conversation, and wherein the composite multimedia product comprises the digital image and the audio segment extracted from the conversation, and wherein the composite multimedia product further comprises a first digital image of a first video chat participant and a second digital image of a second video chat participant.

18. The device of claim 17, wherein the composite multimedia product comprises an image component portion and a metadata component portion combined into a single data file, and wherein the storage memory is configured to store the single data file containing the image component portion and the metadata component portion.

* * * * *